United States Patent [19]
Plachy

[11] Patent Number: 5,154,353
[45] Date of Patent: Oct. 13, 1992

[54] OPTIMIZED WEIR CONSTRUCTION FOR LIQUID DISTRIBUTORS

[76] Inventor: Richard F. Plachy, P.O. Box 187, West Peru, Me. 04290

[21] Appl. No.: 634,744

[22] Filed: Dec. 24, 1990

Related U.S. Application Data

[63] Continuation-in-part of Ser. No. 437,353, Nov. 16, 1989, abandoned.

[51] Int. Cl.$^5$ .............................................. B05B 1/36
[52] U.S. Cl. .................................... 239/193; 405/36; 137/561 A
[58] Field of Search ...................... 239/193, 194, 450; 137/561 A; 73/215, 216; 405/36, 87-89

[56] References Cited

U.S. PATENT DOCUMENTS

| | | | |
|---|---|---|---|
| 1,505,050 | 8/1924 | Lauritsen | 73/215 |
| 1,772,518 | 8/1930 | Pardini | 73/215 |
| 2,373,099 | 4/1945 | Burk | 137/561 A |
| 3,158,171 | 11/1964 | Eckert | 137/262 |
| 3,491,792 | 1/1970 | Eckert | 239/193 |
| 4,267,978 | 5/1981 | Manteufel | 137/561 A |
| 4,715,225 | 12/1987 | Hasegawa et al. | 73/215 |
| 4,776,989 | 10/1988 | Harper et al. | 239/193 |

FOREIGN PATENT DOCUMENTS 2163063  2/1986  United Kingdom ................ 239/193

*Primary Examiner*—Andres Kashnikow
*Assistant Examiner*—Karen B. Merritt

[57] ABSTRACT

A weir construction for regulating liquid flows in conduits or containers having a liquid-gas interface under the influence of gravity or acceleration. Uniform flow distribution between weirs or exact division of flow in other ratios is obtained over a wide range of flow rates by using a weir so shaped that the percent flow error beween two weirs having different heads shall be constant over the range of flow rates. This results in weirs having a modified cusp appearance.

5 Claims, 7 Drawing Sheets

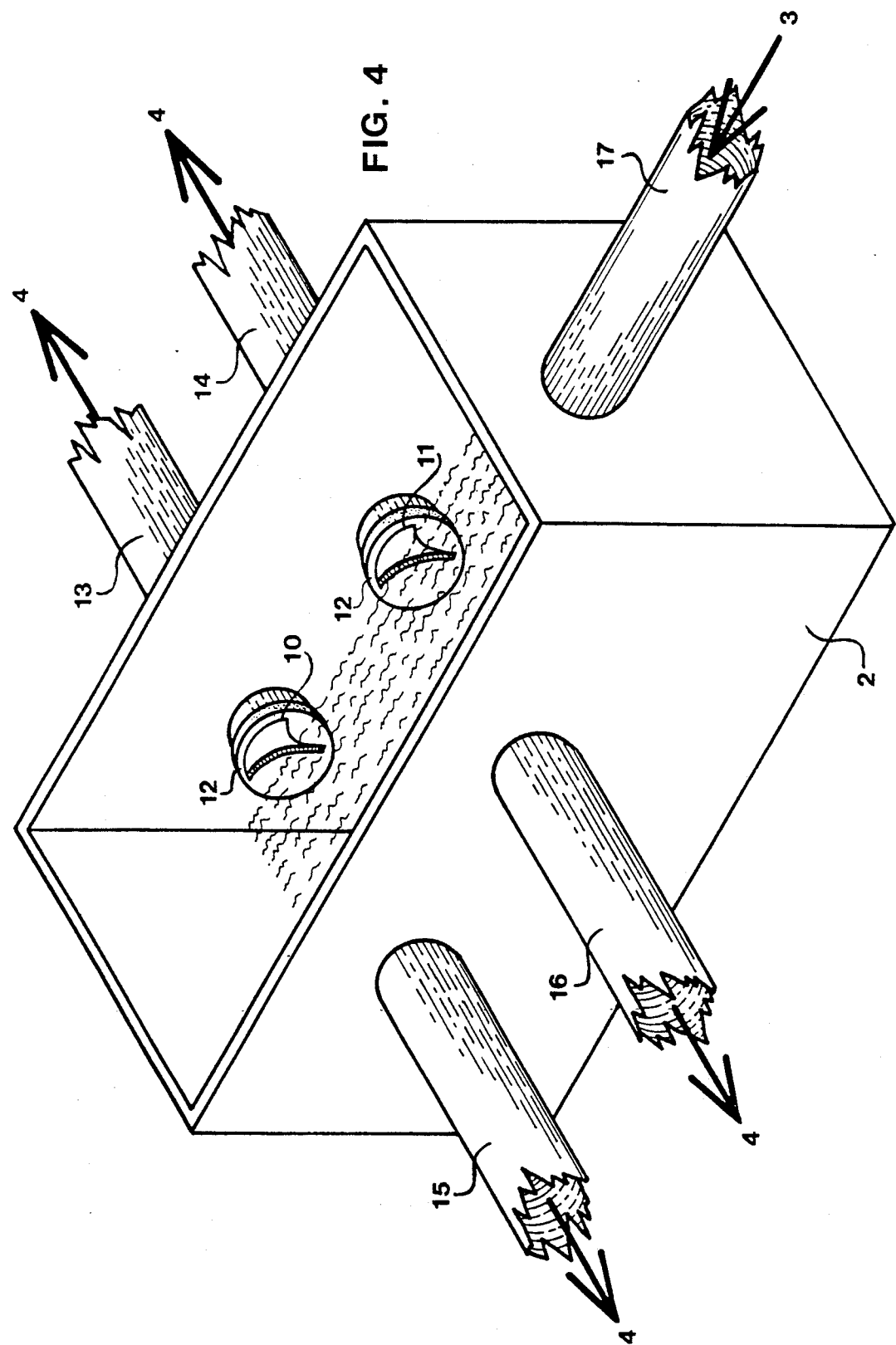

OPTIMIZED WEIR CONSTRUCTION FOR LIQUID DISTRIBUTORS

CROSS REFERENCES TO RELATED APPLICATIONS

This application is a continuation in Part of prior U.S. patent application Ser. No. 07/437,353 entitled "Optimized Weir Construction for Liquid Distributors" filed by the applicant herein, Richard F. Plachy, on Nov. 16, 1989, now abandoned. The entire disclosure of this earlier application is incorporated into this specification by reference.

The proposed invention is a device whose purpose is to divide a flow into two or more streams. This invention is only for free flows in pipes or containers having a liquid/gas interface under the influence of gravity, centrifugal force, or acceleration. This invention allows the flow to be divided more accurately and over a wider range of flows when there is a difference in head between weirs. In another application, it also provides a set of weirs which will divide the flow in any desired ratio.

BACKGROUND OF THE INVENTION

When a subsistence farmer in Asia wishes to divide the irrigation water into two or more parts, he simply hoes out a shallow trough in the sides of the main irrigation ditch to conduct water to lateral irrigation ditches. If two of the shallow troughs are near each other and about the same shape, length and depth (as measured from the water surface), the flow will be divided more or less evenly. This sort of liquid flow dividing is what the proposed invention is for, but the proposed invention has unique features that make it vastly superior to these hoed troughs. Both my invention and the hoed troughs are simply types of weirs, however and thus are variants on a very old concept.

One use for this invention is when the head at the two weirs is slightly different, and yet we want approximately equal flow from each. This difference might be due to vertical misalignment of the weirs, surging due to flow patterns, or other causes. In such a case division of the flow by a V-notch weir or a rectangular notch weir is generally unsatisfactory due to the large difference in the flow over the two weirs. This is especially true at low flows where there may be little or no flow over the weir with the lower head. A normal "V" notch weir will almost triple the flow if the head above the notch bottom changes by a factor of 1.5. This implies that even a slight vertical misplacement of one of the weirs would result in a considerable difference in the amount of flow through that weir. This is one of the central problems in using weirs to divide the flow.

Prior art efforts to solve these problems have included narrow rectangular notch weirs. This does minimize the problem at low flows because the total head is raised making the head differences small compared to the total head. There are at least two significant problems with this approach. First, the narrow opening is quite subject to clogging in many (if not most) open channel applications. Second, it has a very small dynamic range. That is, if it is accurate in dividing the flow at, say, 0.2 gallons per minute, the maximum flow for a device with reasonable total height might be only 0.5 gallons per minute.

In order to overcome these disadvantages prior art includes the modified combination V-notch and narrow rectangular notch. In the modified combination V-notch, the V-notch has a narrow rectangular notch extending downward from the bottom of the "V". This device does solve the problem in part, but also has some disadvantages. The low flow portion (the narrow slot) is still subject to clogging. The high flow region uses the inaccurate V-notch so that a small error in vertical alignment or head will cause a significant error in flow dividing for medium flows. If there is a vertical misalignment, there would be no way to know what the percentage error between outputs would be and that percentage error would be a changing function of the head. The present invention greatly reduces these problems, and also provides a set of weirs with a known minimum accuracy for a given maximum vertical positioning error among the weirs.

Another important use for these weirs is to divide a flow into any specified ratio by the use of such weirs. This invention allows this to be accomplished so that this ratio will be maintained over a wide range of flow with no adjustment in the weirs. There is little prior art along these lines, though the need for such a device is obvious.

BRIEF SUMMARY OF THE INVENTION

After much study and research into the above mentioned problems and possible solutions therefore, the applicant has developed an improved distribution means employing weirs, said distribution means allowing division of a liquid stream into two or more equal parts with any specified relative accuracy, even when some of the weirs are displaced a substantial amount vertically. This invention provides a distribution means employing weirs, which means provides the maximum possible dynamic range for a given level of accuracy in flow division.

It is therefore an object of this invention to provide an improved means for division of a liquid flow stream into equal parts.

Another object is to provide a flow distribution means that will provide good flow division in spite of any intial or subsequent vertical misplacement of the outlets.

Another object of the present invention is to provide a flow distribution means using weirs in which means the maximum error between vertically misaligned weirs will be a predetermined amount over the entire flow range.

Another object of the present invention is to provide a flow distribution means using weirs in which means the range of useful output flows will be maximized.

Another object of the present invention is to provide a new type of weir apparatus with vertically misplaced weirs in which the error in output between weirs follows any chosen function—rather than being constant.

Another object of the present invention is to provide a method by which the changing width of each weir notch with increasing height might be calculated so as to achieve these objects, resulting in a unique shape for each weir, said shape having the characteristic that both the width of each notch and the rate of change in width of each notch increases with increasing height as measured from the bottom of the notch.

Another object of the present invention is to provide a flow distribution means using weirs in which means the flow may be accurately divided in any ratio and this ratio may be held over the entire useful flow range.

Another object of the present invention is to provide a flow distribution means using weirs in which means the flow may be accurately divided in any series of changing ratios, said ratios changing with height and following a prestated formula or list.

Another object of the present invention is to provide a method by which the changing width of each weir notch with increasing height might be calculated so as to achieve the objects in the preceding two paragraphs, resulting in a unique shape for each weir, said shape having the characteristic that both the width of each notch and the rate of change in width of each notch increases with increasing height as measured from the bottom of the notch.

In order to accomplish these objects, a new type of weir apparatus is described. Briefly, the present invention may be described as a weir apparatus wherein the design of each weir follows certain rules resulting in each weir having notch edges shaped in such a way that the resulting weir apparatus will divide flows to the precision required for a given application in spite of vertical misalignment of the weirs with respect to the liquid surface behind the weirs, and will maintain this precision over the entire useful flow range; this then having the effect of insuring that the useful dynamic range of flow rates is maximized. This is accomplished by designing each weir to hold the error between the lowest and highest weirs to a given percentage at each flow rate over the entire range.

Another aspect of this invention may be described as a weir apparatus wherein the design of each weir follows certain rules resulting in each weir having notch edges curved in such a way that the resulting weir apparatus will divide flows precisely in some predetermined ratio or set of ratios between the weirs, and will maintain this exact ratio over the entire useful flow range. This is accomplished by designing each weir as in the paragraph above, but this time the vertical misalignment is deliberate and exact and the percentage error is chosen to achieve the flow ratio desired which will then be held over the entire useful flow range. This divide-any-ratio weir apparatus is truly unique and appears to have virtually no prior art from which it would be said to be an improvement.

All of the main objects of this invention may be accomplished to a great extent by an approximation to the curves required herein. This approximation could take the form of a similar curve, a series of line segments forming an approximation to the desired curve, a series of notches whose bottoms would follow the desired curve, or a separated series of weirs whose additive flow characteristics would equal the flow over one of these weirs for every height. Other approximations to this shape are obvious and are intended to be included in what will be claimed. It is the shape of the total weir opening, whether as one opening or several separated openings, and the way such a shape will be discovered for each new use that is the main invention here.

This invention then has several novel aspects such as the unique curved design in which the rate of curvature increases with increasing height; the weir apparatus capable of giving flow division to any given maximum error between flows, and maintaining this accuracy over the entire flow range; a weir apparatus in which the weirs have the maximum possible useful flow range for a given vertical misalignment and given flow division accuracy; the unique weir apparatus in which the flows may be accurately divided in any chosen ratio over the entire flow range; and, the method by which such the shape of the edges of the weir notches such that all these other novel things might be accomplished. These and other aspects of novelty which characterize the invention are pointed out in some detail in the claims annexed to and forming a part of this disclosure.

BRIEF DESCRIPTION OF THE DRAWINGS

FIG. 4 shows one embodiment of this invention, with the container means 2, the vertically misplaced output weirs 10 and 11, the input pipe 17, and the output pipes 13 14 15 and 16.

DETAILED DESCRIPTION OF THE INVENTION

Figure 1:
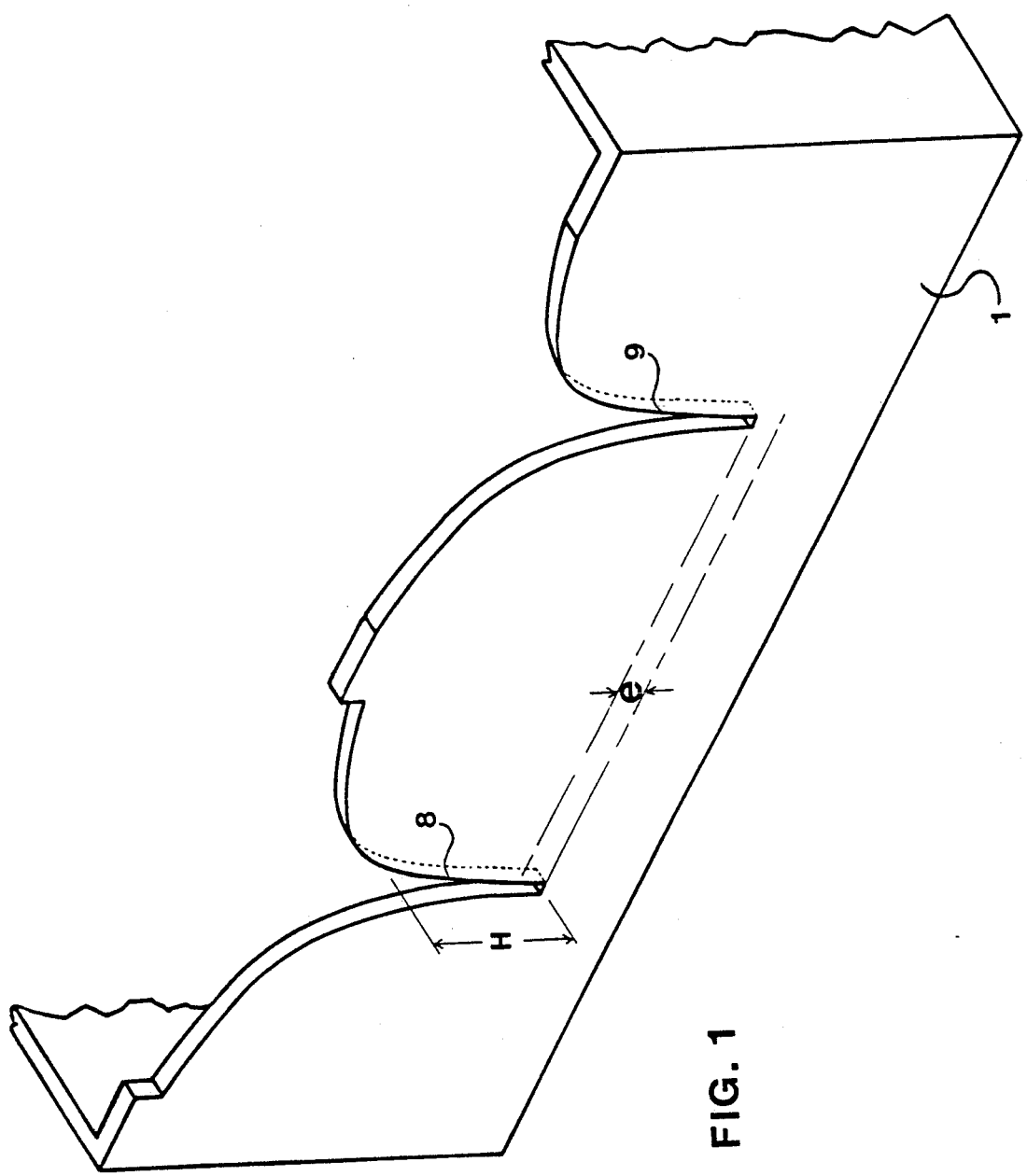
FIG. 1 represents two of the proposed weirs in the walls of a flow dividing container means 1. Note that weir 9 is higher than weir 8 by the amount "e". The curved edges of each weir notch have a shape determined by this invention, said shape being different for each choice of the variables. While it is not necessary for this invention, it is more convenient if the curves are symmetric about the vertical center line of each weir. The liquid in the container means 1 will flow out the weirs if the head H is significantly more than zero. In this figure the head H is measured from the bottom of the lower weir 8 to the top of the liquid in the container 1.
Figure 2:
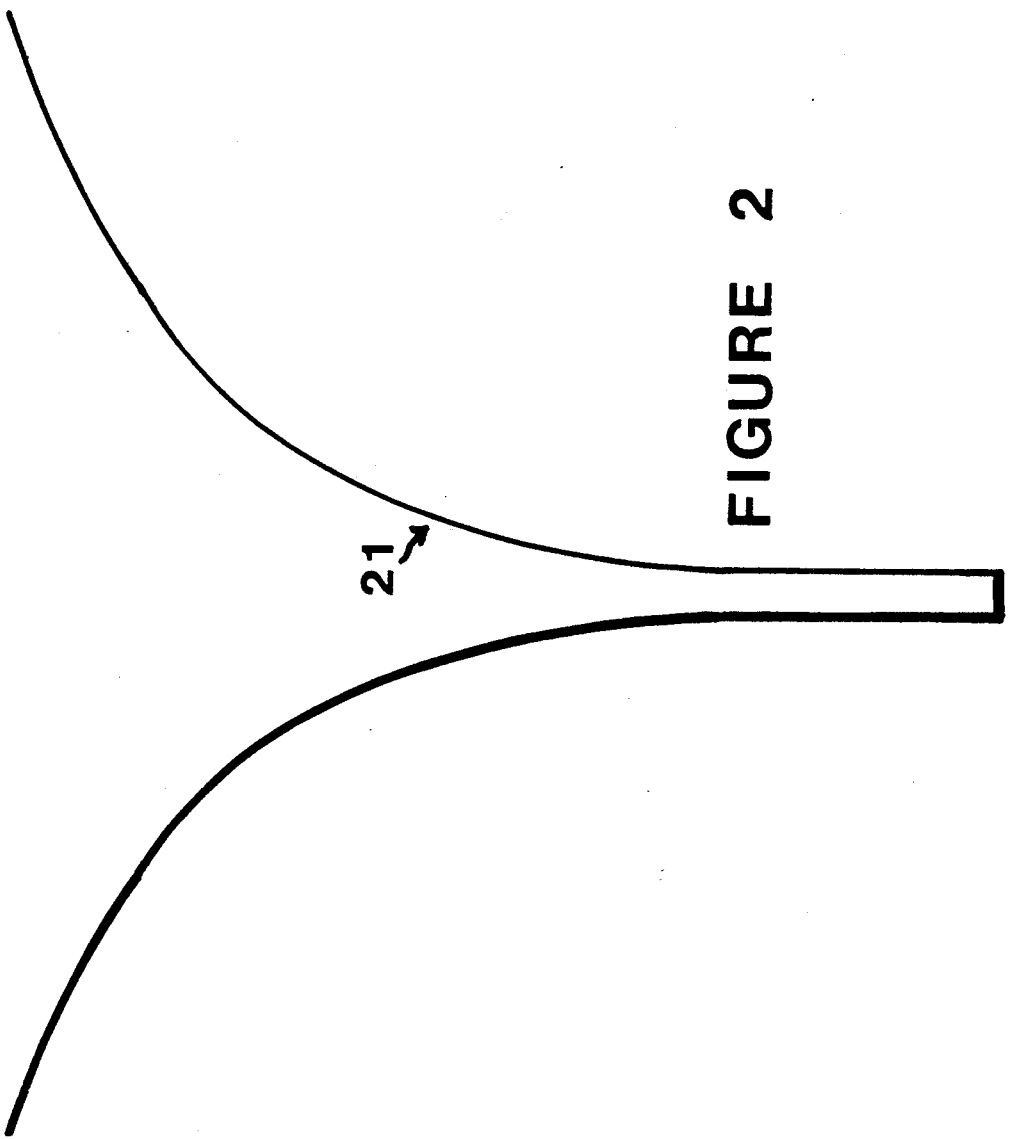
FIG. 2 shows a typical shape for the edges of the weir notch 21.
Figure 3:
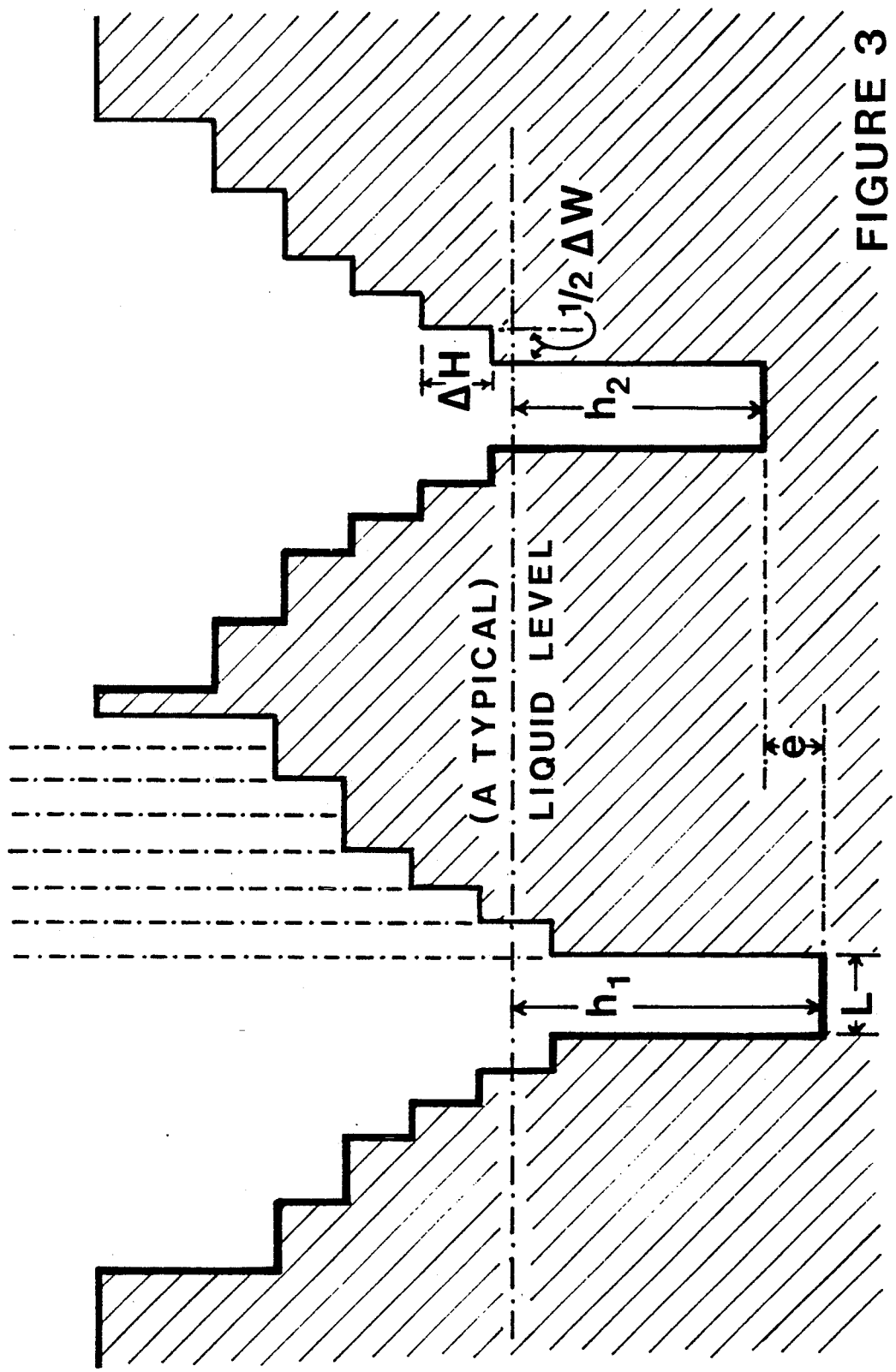
FIG. 3 shows a typical result of a stepwise approximation to the desired weir shape with each approximation represented by a horizontal increment of increasing half-notch width 31, and by a vertical increment of increasing head, h, 32.

FIG. 4 indicates one embodiment of the invention, and this embodiment will be used to illustrate the principles of the invention. FIG. 4 indicates a container means 2, input pipe 17, outlet pipes 13 14 15 16, and outlet weirs 10 11, all arranged as for the distribution box to be used in a prior art septic system. In the following description, it will be assumed that there are only the two outlet weirs 10 and 11, the flow from which flow through the outlet pipes 13 and 14 respectively. The other outlets are assumed to be blocked off. This is for simplicity only as the invention does apply to systems with any number of outlets. The outlet weirs are shown mounted so that the left hand outlet weir 10 is higher than the right hand weir 11, as measured from the surface of the liquid (water in this case) inside the container means 2. This is to simulate the effect of normal construction practices and settling which generally results in a vertical misalignment on the order of 0.2 inches. When the container means is used to divide the effluent flow into equal parts, this vertical misalignment is a very significant problem, especially at low flows. In contrast to the invention here, a prior art container means for a septic system is called a distribution box and has no weirs at all on the outlets other than the open ends of the pipe protruding through the walls of the container means. Effluent then flows from the inlet pipe 17 into the container means 2, where it slowly raises the level of liquid. When the level of liquid reaches the bottom of the right hand weir 11, liquid begins to trickle through that weir at a very slow rate, not usually fast enough to keep up with the rate of input. Further flow then raises the level of liquid in the container means still more, finally causing liquid to trickle out the higher weir 10 too. Further flow then causes the liquid level to rise still further until an equilibrium is reached wherein the flow through the outlet weirs 10 11 is equal to the flow in the inlet pipe 17. When we compare the amount of flow through the two weirs, we will always find that the higher weir 10 carries less than the lower weir 11. In an unimproved prior art septic system distribution container means with open pipe outlets, all of the low flow effluent would go down the lower pipe. Thus the addition of any weirs helps toward correcting this as the greater impedance of the weirs causes the liquid level to rise so much farther that the original offset in elevation between the outlets becomes a small fraction of the total head at lower flows. The present invention improves on this still further by utilizing a particular shape for the weirs, said shape causing the percentage difference between the flows through the outlet weirs 10 11 to be held to a given percentage error from some given minimum flow to the top of the weirs.

The proposed invention utilizes weirs shaped like those in FIG. 1. The exact shape would be different for each application. The curve forming the edges of the weir is arrived at by the following process. Choose a maximum allowable error between the flow rate at various outlets, a maximum expected vertical offset (placement error) between weirs, and choose a minimum flow above which the weirs must exhibit the required maximum error in flow rate between weirs. Depending on the form of the weir notches used below the level at which the weirs must exhibit this maximum error, this will imply a particular notch width at that point in height on the weir notch. The acceptable range of difference in flow between the weirs may be expressed in several ways. Here it will be arrived at by this process: for any given flow in the weir having the highest head subtract from this flow the flow in the weir having the lowest head and then divide the result by the flow in the weir having the highest head (or the average between the two). This gives a dimensionless fraction representing the error between the two flows. This number is chosen to fit the application. In the case of a septic system, 15% to 20% would be adequate accuracy, for example. Then decide what our acceptable level of error shall be for any flow. In the simplest case, one might state that an error of 0.11 is acceptable for the whole flow range, for example. One might also choose to have a flow error which is higher at low flows and lower at high flows (or vice versa).

The relationship between the vertical offset, e, between the weirs (which we will set at 0.1 inches for this problem), and the desired error in flows directly implies a minimum weir height for a narrow rectangular notch that must be achieved before reaching the target error value (11% in this example). This follows by using the usual formulas for flow through rectangular notches, then setting the formula for error vs flow equal to the desired error:

$(F_1 - F_2)/F_1 = E = 0.11$ where $F_1$ is the flow through the lower notch 11 expressed in terms of the head against that notch, $h_1$; $F_2$ is the flow through the higher notch 10 in terms of $h_2$ and E is the error in flow between notches.

Thus, regardless of the width of the notch, the fact that the notch is rectangular at the bottom implies a particular head (liquid height against the weir) that must be reached in the lower weir before the desired accuracy is achieved. The actual operating range for this invention begins at that head. Since each problem has a particular need for accuracy down to some minimum flow level, this must be chosen at this point. For the septic system used as an example here, the level chosen is $F_1 = 0.5$ Gallons per minute. These calculations then imply that the bottom of the notch will be 0.1155 inches, and the portion of the notch below the operating range of the invention will be approximately 1.3 inches.

Next by calculation or measurement we determine the weir shape such that—above a certain minimum flow (determined by the width at the bottom and the acceptable error fraction between the flows)—the flow error shall always be equal to the number we have chosen, regardless of the flow rate. By contrast, a rectangular notch has lower and lower relative error as the flow increases, but it has this at the expense of dynamic range.

Thus we find a curve for the weir notch such that:
$E = (F_1 - F_2)/F_1 =$ given constant (or some given function)

(this is the maximum allowable error for all flows)

In the example weir here, the value for E will be held to approximately 0.11. We then as a matter of mathematical fact have the largest possible dynamic range for any given total permissible change in head, allowable relative error, and head difference between weirs. This is true though we also have the best arrangement for minimizing the low flow error. The curve required for the notch edges is most easily determined by an iterative approximation process and results in a curve in which both the notch width and the rate of increase in notch width increase with increasing height.

In the example here, an example of one type of procedure for obtaining the shape of the weir is described. There are many such mathematical approximation methods, all of which will arrive at the weir shape disclosed in this invention, and all of which can be a part of the method of arriving a this desireable weir shape. An increment of elevation on the weirs (head), that is, an increment in h (the elevation of the liquid on the weir), will be chosen. In this example, 0.01 feet will be used. That is, the width increase required to hold E to 0.11 will be recalculated every 0.01 feet. An increment in width is also chosen. This example will use 0.025 inches on each side of the weir (for a total increase of 0.05 inches) as the increment. That is, the width will be increase in increments of 0.05 inches or some multiple thereof. Using standard engineering formulas for rectangular notch weirs, the flow through the two weirs in terms of the head against the lower weir may then be calculated. By considering each additional increment in width another weir of width 0.05 inches the bottom of which is at the elevation found, one can calculate the total flow for each of the now compound rectangular weirs by adding the contributions to flow of the central notch and each additional incremental notch together. At each new level the total flows are calculated and E is calculated. When E drops more than a small amount below the target value of 0.11, the notch must be widened so as to keep the value of E near 0.11. This results in a series of notch widths vs elevation and total flow as shown in table I.

TABLE I

| HEIGHT (in) | WIDTH (in) | FLOW RATE, $F_1$ (ft³/sec) |
|---|---|---|
| 1.24 | .1155 | .09553 |
| 1.32 | .1655 | .11021 |
| 1.44 | .2155 | .12689 |
| 1.68 | .2655 | .16875 |
| 1.80 | .3155 | .19407 |
| 1.92 | .3655 | .22339 |
| 2.04 | .4155 | .25740 |
| 2.16 | .4655 | .29642 |
| 2.28 | .5655 | .34090 |
| 2.40 | .6155 | .39273 |
| 2.52 | .7155 | .45142 |
| 2.64 | .8655 | .51883 |
| 2.76 | .9655 | .59731 |
| 2.88 | 1.1155 | .68751 |
| 3.00 | 1.2655 | .79127 |
| 3.12 | 1.4155 | .90993 |
| 3.24 | 1.7155 | 1.05533 |
| 3.36 | 2.0155 | 1.20243 |
| 3.48 | 2.2155 | 1.39513 |
| 3.60 | 2.5155 | 1.59411 |
| 3.72 | 2.9155 | 1.83656 |
| 3.84 | 3.4155 | 2.10590 |

Figure 5B:
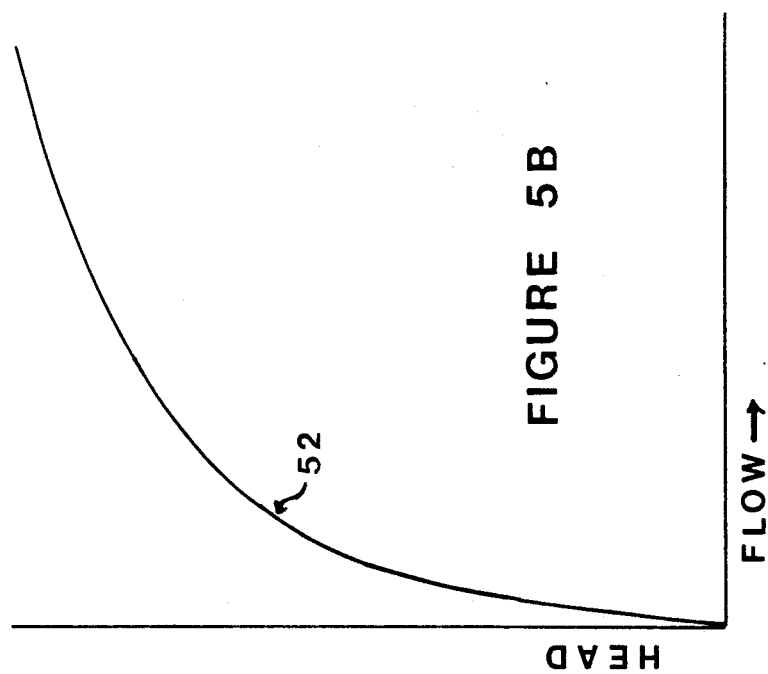
FIG. 5B shows the approximate curve of flow vs head 52.
Figure 5A:
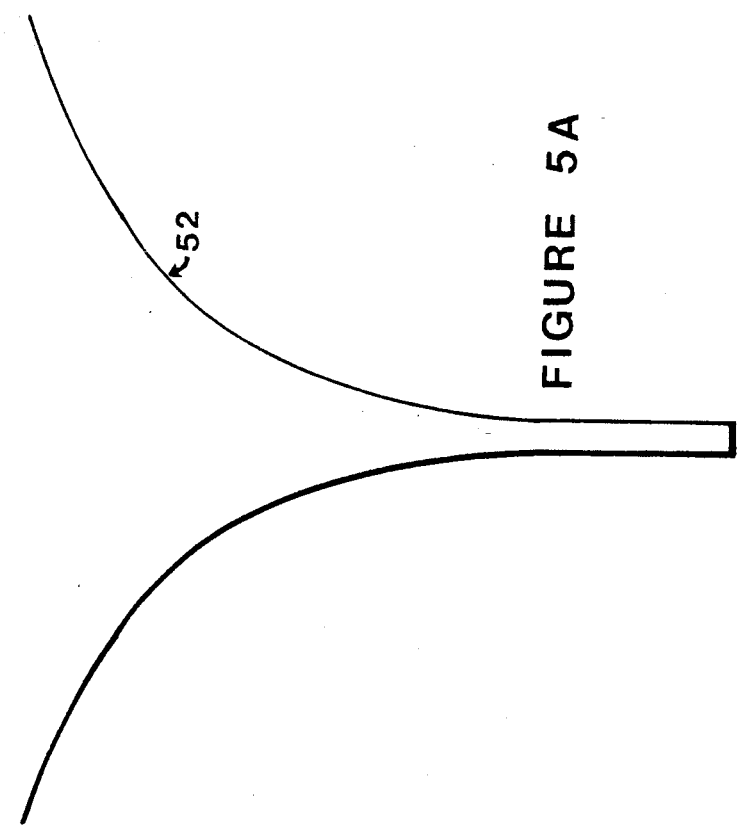
FIG. 5A shows the approximate shape for the notch 51.
Figure 6A:
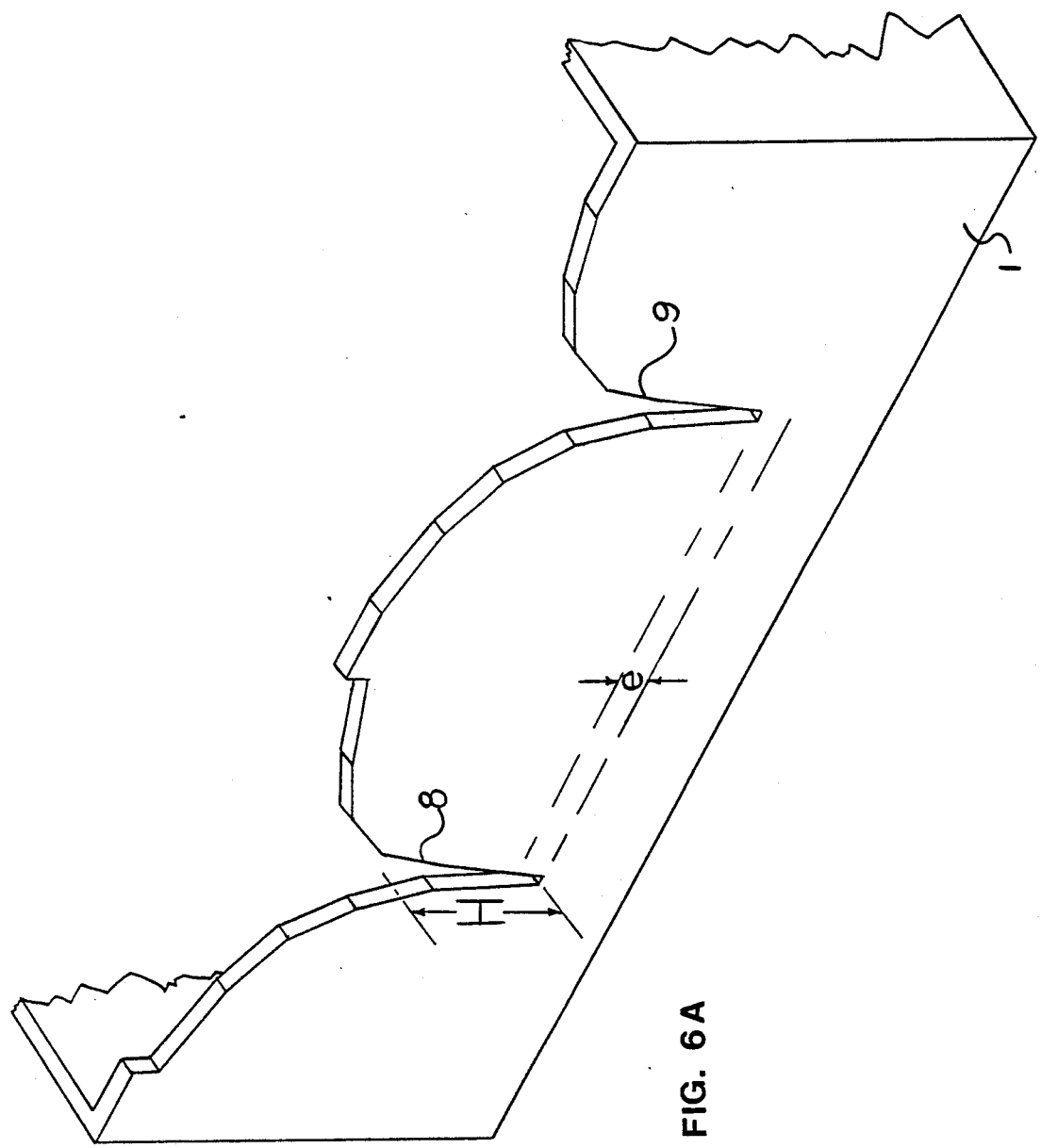
FIGS. 6A and 6B show how the weir notch edges may be approximated by short line segments and steplike segments, respectively.
Figure 6B:
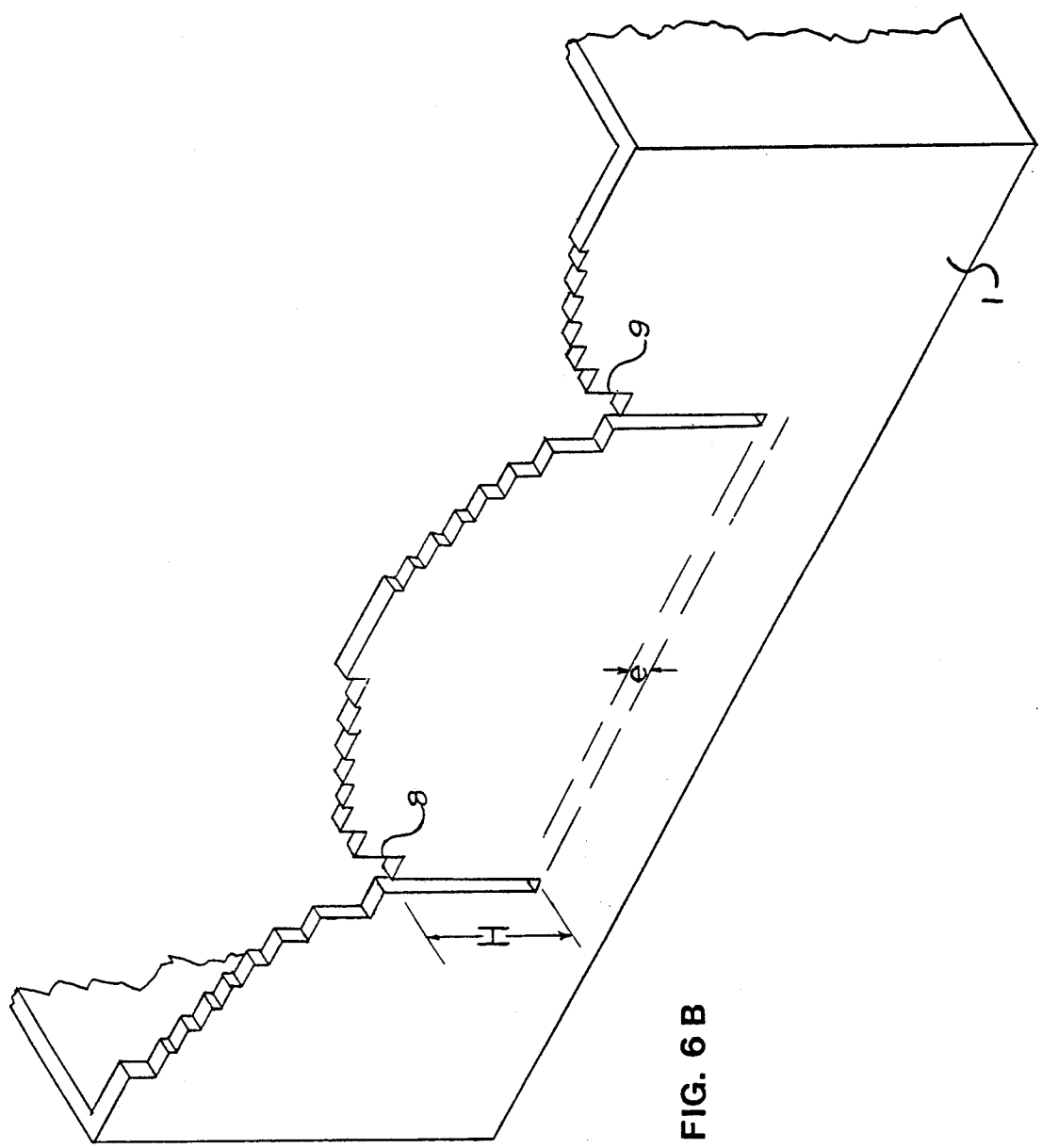

FIGS. 5A and 5B show these results in the form of a notch shape 51 and a curve of flow vs height on the weir 52.

The notch so discovered has five times the useful flow range (dynamic range) of a simple rectangular notch having the same low flow accuracy. It has a flow error held to approximately 11% throughout the whole range of useful flows. Other weir shapes must fail to meet similar goals to approximately the same extent that their shapes differ from this curve. This is necessary because we defined our curve such that it is the only curve meeting these goals. Since none of the prior art weirs used to divide flows equally approximate this shape, none approach this sort of performance. In the specific embodiment described, the designer of the septic system would know that each separate drainage area receiving effluent from one of the output pipes 13 or 14 would get the same flow from the distribution means 2 to within 11%.

Thus it will be seen that these technical improvements of the present invention operate to solve the above mentioned technical problems of the prior art by providing a weir of a shape designed so that the difference between the flows through two vertically misaligned outlets using such weirs divided by the flow through the lower weir, will be held constant over the useful range of flow rates.

To design this weir shape, the vertical offset between the two weirs and the required minimum error must be known. This allows a simple calculation to determine the height at which a simple calculation to determine the height at which a simple rectangular notch will give this accuracy of flow division between the weirs. Given the minimum flow rate at which we must control the flow to a given percentage error, it is a simple matter to calculate a narrow rectangular notch width such that the flow will be just this minimum when the head reaches the height at which the weirs will provide the minimum accuracy as already calculated. Having this it is now a matter of forcing the notch to increase its width with increasing notch height just enough to satisfy the relation:

$$(F_1 - F_2)/F_1 = E$$

where $F_1$ is the flow through the lowest weir, $F_2$ the flow through the highest weir, and E is the error between these flows.

In the example embodiment described, E is a constant at 11%. This is not necessary in general, however, and E may follow any desired approximately continuous function either increasing or decreasing with height. Use of this notch shape and this method for determining that shape will still result in having a known error over the flow range, and in the maximum possible dynamic range for the variables given.

The shape of the notch below the point where it just meets the desired error between offset weirs is not really part of this invention. A simple rectangular notch is described because it is simple to handle mathematically, but any shape will do just so that the error is at the target value at the minimum flow rate for which this is a required condition. That then becomes the starting point for the shape claimed in this invention.

In deriving this curve for the shape of the weir edge in the above example, the total notch was divided into vertically parallel segments. Except for the central original rectangular section, all are the same width or a multiple of that incremental width. While this is done for ease in calculation, it is true in reality that the same flow handling characteristics (approximately) will exist if all of these vertical segments are separated spatially and the flows through them collected and added together. In that case, of course, these segments could have any set of varying widths and bottom elevations, provided only that the sum of the flows comprising the lowest such divided compound weir and the highest such divided compound weir still have an error in flow equal to the given function E throughout the useful flow range.

The other use for such a weir shape is to form an apparatus to deliberately divide a flow into some given ratio other than 1:1. This comes naturally out of the above analysis. A flow division apparatus was described which given a vertical offset between weirs, held an 11% error throughout the useful flow range. It may easily be seen, however, that if we could place our weirs with any desired accuracy and keep them in that position, then by deliberately setting an offset of 0.1 inches as described above, and by following the same technique, we have created a set of weirs that will always divide the flow into a ratio between weirs of 8:9. What if we had designed for a constant error, E, of 0.50? Then, if we instead held our offset to exactly that maximum number used in the calculations, we would have an apparatus that would divide the flow into the ratio 2:1, and would have done it simply through the use of weirs. It would hold this exact ratio between outputs over the entire useful flow range. This remarkable application is so novel that there really is no prior art using weirs. It should be clear that any ratio may be chosen. Further, it would even be possible to design it to change ratios as the flow increased.

In the case of both the constant error apparatus and the divide-any-ratio apparatus, the shape which is the subject of this invention may be approximated by the method shown, by line segments, by step-like segments, by segments of curves, etc.

In the case of both the constant error apparatus and the divide-any-ratio apparatus, one of the important novel improvements is that with all their unique and useful characteristics in dividing the flows, the resulting weirs are identical in any one apparatus and thus may be easily mass produced for all similar devices, or any other problems with the same parameters. For the case of the divide-any-ratio weirs, this fact may only apply to a flow division apparatus employing three or fewer weirs. While it is certainly possible to use the same design rules for four or more weirs in one apparatus; it may be that if more than two ratio relationships exist between the outlet weirs, the the weirs would then not only be mounted at differeing elevations, but might also have different basic shapes. By different ratio relationships I mean that, for example, we could have four outlets in ratios of, say, 5:4:4:4 or 5:5:4:3 and still have identical weirs at different vertical offsets. However for 5:4:3:2, it may be necessary to have at least two different weir shapes in the one flow division apparatus. Luckily, such a flow division requirement would be quite unusual. Still, if it should occurr, the same method described here would allow such a design by simply setting each outlet to bear a given relation to the lowest outlet as though those were the only two outlets.

The curves for the weir edges for this invention will have the characteristic that both the notch width and the rate of change of notch width will both be an increasing function of increasing height on the weirs.

While use in a septic system was used as an example, the invention is seen as having wide application to many flow problems, and it is not the intention to limit the scope of the invention.

I claim:

1. A flow dividing apparatus for dividing a flow of liquid into a predetermined ratio comprising:
   a liquid containing means,
   a liquid delivery means for delivering liquid to said liquid containing means,
   at least two liquid receiving means each having an end connected to said liquid containing means to receive liquid therefrom,
   at least two weirs located such that a weir is positioned between each said end of said at least two receiving means and said liquid containing means,
   said at least two weirs each comprised of an opening having a bottom, two sides, and a top,
   said liquid containing means being positioned such that the bottom of the opening of at least one weir is at a higher elevation than the bottom of the opening of at least one other weir so as to establish a vertical misplacement between the weirs,
   said sides of said at least two weirs having a shape such that the equation $(F_1 - F_2)/F_1 = E$
   where $F_1$ is the flow rate of liquid through the lower weir,
   $F_2$ is the flow rate of liquid through the higher weir, and E is a predetermined, set, maximum acceptable error in the flow division
   is satisfied for any given liquid flow rate above a minimum, predetermined liquid flow rate.

2. A flow dividing apparatus according to claim 1 wherein said shape of said sides of said at least two weirs is formed using short line segments.

3. A flow dividing apparatus according to claim 1 wherein said shape of said sides of said at least two weirs is formed by steplike segments.

4. A flow dividing apparatus according to claim 1 wherein said at least two weirs are formed integral with a wall of said liquid containing means.

5. A flow dividing apparatus according to claim 1 wherein said at least two liquid receiving means comprises pipes, each pipe having an end which extends through a wall of said liquid containing means, and said at least two weirs being connected to said ends of said pipes.

* * * * *